March 23, 1954   A. B. ROOD ET AL   2,673,011
LIQUID DISPENSING VALVE
Filed May 1, 1950
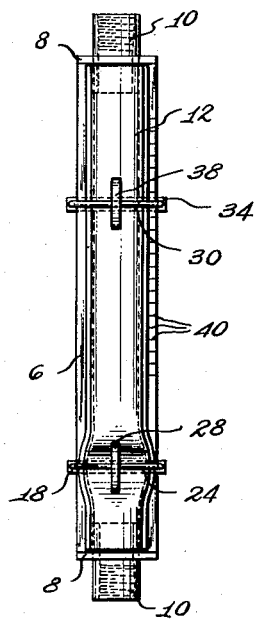
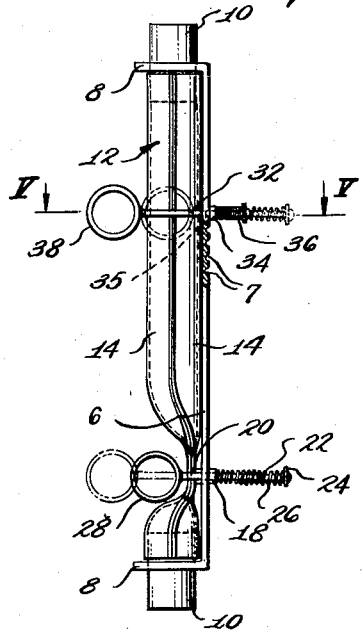
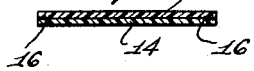
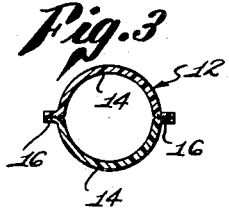
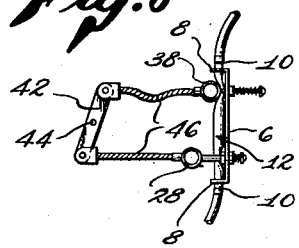
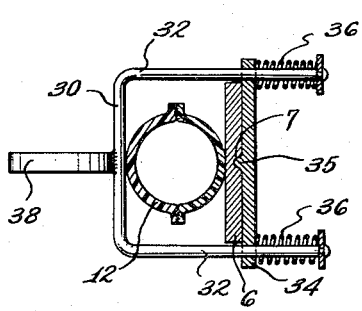
INVENTORS
ASHTON B. ROOD
BY KELLY B. CARR
W™ Edward Hann
Attorney Patented Mar. 23, 1954

2,673,011

UNITED STATES PATENT OFFICE 2,673,011

LIQUID DISPENSING VALVE

Ashton B. Rood and Kelly B. Carr, Los Angeles, Calif., assignors to Techkote Company, Inc., Inglewood, Calif., a corporation of California Application May 1, 1950, Serial No. 159,238

3 Claims. (Cl. 222—207)

This invention relates to a measuring valve and is particularly adapted for use in measuring and dispensing liquids.

This type of valve is specially adapted for use in adding to concrete mixes certain measured quantities of liquid air-entraining agents. This liquid is added to the mix approximately simultaneously with the dumping of the water, as well as the cement, sand and gravel into the concrete mixer.

An object of the invention is to provide a simply constructed yet highly efficient liquid dispensing valve which contains no relatively movable head and seat elements or plug and core elements or other similar structure such as are found in conventional valves and subject to wear and corrosion and resultant leakage.

Another object of the invention is to provide a valve through which measured quantities of liquid can be dispensed and wherein the quantity can be varied quickly and conveniently.

Another object is to provide a valve member including a flexible tubular element having means for constricting spaced portions thereof to permit measuring of specific quantities of the liquid and wherein the measuring and dispensing means can be operated by simple hand movement or can be arranged for connection to some mechnical operating means.

A further object of the invention is to provide an improved type of flexible tubular element per se which is particularly adaptable for use in devices of this type.

The above and other objects and advantages of the invention will more fully appear from the following description in connection with the accompanying drawings wherein:

Fig. 1 is a front elevational view.

Fig. 2 is a side elevational view.

Fig. 3 is a sectional view through the tubular element in its expanded position.

Fig. 4 is a sectional view through the tubular element in its collapsed position.

Fig. 5 is a plan view of one of the tube constricting clamps.

Fig. 6 is a view, in a reduced scale, of another form of operating means.

The device includes a body member 6 having ends 8 which are bent parallel to each other and through which extend short conduit coupling tubes 10 which may or may not be threaded at their outer ends depending upon the type of conduit to whch they are to be connected. The coupling tubes 10 are rigidly supported by the ends 8 of the body member 6.

Connected between the inner ends of the coupling tubes 10 is a piece of flexible tubing 12. This tubing is formed of two sheets 14 of a suitable flexible material such as one of the many commercial plastics in use today. The edges of the sheets 14 are united in a flush or flat relationship.

In Fig. 4 there is shown an adhesive 16 which joins the adjacent faces of the sheets along their longitudinal edges. It is contemplated that joining of the sheets may be accomplished with an adhesive or by heat-sealing or a solvent in accordance with practices generally known and depending upon the type of plastic material used.

The plastic tube 12 readily collapses because it is composed of two sections of flat material. The ends of the tube may be secured to the coupling elements 10 by means of an adhesive, or mechanical coupling means (not shown) may be used.

The lower portion of the body member 6 has a cross bar 18 welded thereto, the ends of the bar extending laterally beyond said body member as shown in Fig. 1, and the bar 20 extends across the body member 6 parallel to bar member 18 but on the opposite side of body member 6. The cross member 20 is slightly shorter than cross member 18 to lie between the parallel arms 22 of a U-shaped clamp 34 whose arms are slidable through the ends of the cross member of the bar 18. The ends of the arms 22 have washers 24 riveted thereon and expansion springs 26 are mounted on said arms 22 and positioned between the washers 24 and the cross bar 18.

The U clamp 24 has a ring 28 secured to the bridge portion thereof and by means of the ring the clamp can be pulled to compress the springs 26. When the ring 28 and clamp 24 are released, the springs 26 will cause the bridge of the clamp 24 to collapse the lower end of the tube 12 between the clamp bridge and the cross bar member 20.

A second U clamp 30 straddles the tube 12 and body member 6 and has its parallel arms 32 extending slidably through the ends of a movable cross bar member 34. The arms 32 have springs 36 thereon in the same manner as the springs 26 mentioned above. The U clamp 30 has a ring 38 thereon in the same manner as the ring 28 on clamp 24.

The clamp 30 and its supporting cross bar member 34 are slidable longitudinally of body member 36 and the plastic tube 12. As a result various desired amounts of liquid can be trapped between the clamp 24 and 30 when both clamps are released to permit them to collapse or close underlying portions of the tube 12.

The body member 6 is shown provided with a series of dimples 7 which are adapted to selectively receive a small projection 35 on the inner central portion of the cross bar 34 to hold the upper clamp assembly in its desired vertically adjusted position.

One flat side of the body member 6 is provided with a series of graduations 40 which preferably are provided with suitable indicia indicating fluid quantities such as ounces or cubic centimeters. This permits adjustment of the movable clamp 30 and entrapment of any desired amount of liquid between the two clamps whereupon the lower clamp 24 can be released to dispense the amount of liquid.

The upper connector tube 10 can be connected by a pipe or piece of flexible tubing to a supply tank for a quantity of air entraining agent which is adapted to be fed in desired amounts to concrete mixes. The lower connector element 10 can be coupled to a flexible tube which terminates at the entrance of a concrete mixer so that measured quantities of the chemical air-entraining agent can be introduced to the ingredients of a concrete mix at the time such ingredients, including water, are placed in the mixer.

The device is simple in structure and as stated above, it eliminates conventional valves which would be subject to corrosive action of the chemicals and are more difficult to operate in a combination of this general type.

The device shown can be operated by hand. In the position of Figs. 1 and 2 the tube 12 will become filled with liquid from the supply tank. This is due to the fact that the upper tube constricting clamp 30 is held out to permit liquid to flow in while the lower clamp holds the tube in a constricted position. The upper clamp can be released to constrict the adjacent portion of the tube and the lower clamp pulled out to permit the entrapped measured quantity of liquid to flow to the mixer.

The clamps 24 and 30 are so constructed that they can be conveniently connected to some mechanical operating means which would function to permit the upper clamp 30 to close before the lower clamp 24 is opened and also to permit the lower clamp to close before the upper clamp is again opened. This is indicated generally in Fig. 6 which shows a lever 42 having central pivot 44 and having its ends connected by flexible linkage 46 to the rings 28 and 38. There is sufficient slack in the flexible linkage 46 to permit the relative movements of the clamp 24 and 30 described above.

It will of course be understood that various changes can be made in the form, details and proportions of the various parts without departing from the spirit of the invention.

We claim:

1. In a liquid dispensing valve, an elongated vertically disposed body member having a generally flat front face portion, a flexible tubular element extending along the body member and lying against the flat front face portion, a pair of spaced tube constrictors carried by said body member, each of said constrictors including a U-shaped clamp lying about the tubular element and having its legs extending rearwardly at each side of the body member, and the U-shaped clamps being equipped with springs to press a transverse part of the tubular element against the body member to cut off flow through the tubular element.

2. The structure in claim 1, and one of the clamps being movable toward and away from the other and along said body and tubular element, its spring creating sufficient pressure of the clamp against the tubular element to retain the clamp in position.

3. In the liquid dispensing valve, a flexible tubular element adapted for connection to a liquid line, a pair of tube constricting devices mounted at spaced points along said tubular element, springs for actuating said consricting devices, one of said devices being movable along the tubular element and toward and away from the other constricting devices to permit varying of the amount of liquid trapped between them, and the spring on the movable constricting device being operable to retain the constricting device in position on the tube.

ASHTON B. ROOD.
KELLY B. CARR.

References Cited in the file of this patent

UNITED STATES PATENTS

| Number | Name | Date |
|---|---|---|
| 143,907 | Hyde | Oct. 21, 1873 |
| 210,334 | Kinsman | Nov. 26, 1878 |
| 1,219,846 | Nelson | Mar. 20, 1917 |
| 1,432,882 | Lobl | Oct. 24, 1922 |
| 1,702,974 | MacDonald | Feb. 19, 1929 |
| 1,876,988 | Lormor | Sept. 13, 1932 |
| 2,112,625 | Jackson | Mar. 29, 1938 |
| 2,356,212 | Burdett | Aug. 22, 1944 |

FOREIGN PATENTS

| Number | Country | Date |
|---|---|---|
| 142,472 | Austria | of 1935 |